US008905893B2

(12) United States Patent
Vedeneev

(10) Patent No.: US 8,905,893 B2
(45) Date of Patent: Dec. 9, 2014

(54) AUTOMATIC GEARED VARIATOR FOR CHANGING GEAR RATIO WITHOUT DISENGAGING GEARS AND WITHOUT CONTROL DEVICES OR THEREWITH

(75) Inventor: Sergey A. Vedeneev, Krasnoyarsk (RU)

(73) Assignee: Automatic Transmissions, Ltd., Moscow (RU)

( * ) Notice: Subject to any disclaimer, the term of this patent is extended or adjusted under 35 U.S.C. 154(b) by 512 days.

(21) Appl. No.: 13/063,664

(22) PCT Filed: Dec. 1, 2008

(86) PCT No.: PCT/RU2008/000735
§ 371 (c)(1),
(2), (4) Date: Jun. 16, 2011

(87) PCT Pub. No.: WO2010/030205
PCT Pub. Date: Mar. 18, 2010

(65) Prior Publication Data
US 2011/0245015 A1  Oct. 6, 2011

(30) Foreign Application Priority Data
Sep. 11, 2008 (RU) ................. 2008136621

(51) Int. Cl.
*F16H 37/06* (2006.01)
*F16H 3/74* (2006.01)

(52) U.S. Cl.
CPC ....................................... *F16H 3/74* (2013.01)
USPC .......................................... 475/330; 475/347

(58) Field of Classification Search
USPC .......... 475/220, 221, 330, 337–340, 344–347
See application file for complete search history.

(56) References Cited

U.S. PATENT DOCUMENTS

| 8,585,533 | B2 * | 11/2013 | Hwang et al. ................. 475/219 |
| 8,608,613 | B2 * | 12/2013 | Le Moal ......................... 475/347 |
| 2002/0091032 | A1 * | 7/2002 | Hayabuchi et al. ........... 475/278 |
| 2011/0045931 | A1 * | 2/2011 | Raghavan et al. ............ 475/221 |

FOREIGN PATENT DOCUMENTS

GB  2238090 A  5/1991

OTHER PUBLICATIONS

International Search Report, PCT/RU2008/000735; Mailed, May 21, 2009.

* cited by examiner

*Primary Examiner* — Justin Holmes
(74) *Attorney, Agent, or Firm* — Harris Beach PLLC

(57) ABSTRACT

An automatic toothed variable-speed gearbox is provided, comprising two or more stages of planetary mechanisms, wherein each stage of planetary mechanisms comprises sun gears, a carrier gear and planetary gears, which can be optionally bilateral. The planetary mechanisms comprise two or more power-transfer flows. In one embodiment, the carrier gear of the first stage can be integrated with the sun wheel gear of the second stage, wherein the sun wheel gear of the first stage can be integrated with the carrier gear of the second stage, wherein the transmission ratio is changed without disengaging gears and without using control devices by initially stopping at least one gear in a stop position or in a position adjacent to the stop position, depending on equality or closeness of forces which are originated from different power flows, and which are opposite in terms of orientation, and which are applied thereto from different sides and from main power flow gears split by gears of the cinematic chains, wherein the forces are further determined by the load, ratio between diameters of the gears, center-to-center distances, which are further determined by quantity of teeth thereof and by pitch modules, and due to movability of said gear which is determined by change in load, forces, the gears' circular and relative velocities in such a way that such an equality is reestablished due to the tendency of the forces to balance and to set the gears into the initial balanced position.

17 Claims, 40 Drawing Sheets

AUTOMATIC GEARED VARIATOR FOR CHANGING GEAR RATIO WITHOUT DISENGAGING GEARS AND WITHOUT CONTROL DEVICES OR THEREWITH

CROSS REFERENCE TO RELATED APPLICATIONS

This application is a National Stage filing under 35 U.S.C. §371 of PCT Application No. PCT/RU08/000,735, filed on Dec. 1, 2008 which claims priority to Russian Patent Application No. 2008136621, filed Sep. 11, 2008.

FIELD OF THE INVENTION

The invention relates to engineering industry and can be used in other industries for driving machines and mechanisms; particularly, the invention can be used as an automatic toothed variable-speed gearbox with stepless variable gear ratio without disengaging gears in the absence of control devices.

The invention has no analogues.

BACKGROUND OF THE INVENTION

Known types of gearings, including planet, differential, wave and other types of gearings fail to provide automatic change of gear ratio without disengaging gears and in the absence of control devices (see V. N. Kudryavtsev "Planetary Gearings. Reference Book". M.: Mashinostroenie, 1977; Yu. N. Kirdyashev "Multiengine Differential Gears". L.: Mashinostroenie, 1981; A. Krainev "Machines Mechanics. Basic Dictionary". M.: Mashinostroenie, 2000).

SUMMARY OF THE INVENTION

Thus, it is an object of the invention to provide an automatic toothed variable-speed gearbox capable of varying gear ratio without disengaging gears in the absence of control devices, under varying load applied to a driving shaft and/or driven shaft.

The problem is solved according to the invention by providing an automatic toothed variable-speed gearbox comprising at least two stages of planetary gear-trains, wherein the gearbox comprises kinematic chains with at least three degrees of freedom, has at least two power-transfer flows, and provides the possibility of initial stopping of at least one gear or placing it in a position close to the stop position, wherein other gears remain movable. The said initial stop is executed due to the action of forces applied to the gear from different sides and from different power flows, wherein the forces are initially equal or have similar values in terms of magnitude and opposite in terms of orientation, and wherein the forces depend on the load, the choice of gears' diameters, and center-to-center distances therebetween.

Whereas, the power is transferred through another kinematic chain having movable gears. The gear ratio is changed when the load applied to the driving gears and/or driven gears is changed due to changing balance of the opposite forces, and, as a consequence, movability of the stopped gear, that automatically pull together the gears' circular and relative velocities till they completely match each other and vice versa without disengaging gears, automatically.

The above described initial stop of the gear in a stop position or adjacent to the stop position functions as stopping gears in known types of gearings, such as planetary, differential, wave, etc, where stopping is effected by fasteners, control devices, or by other means. Thus, the gear's movability due to the change in the ratio of forces determines automatic change of gear ratio due to change in the gears circular and relative velocities.

The initial balance of forces depends on the following:
particular diameters of gearwheels and center-to-center distances;
structural embodiments of kinematic chains;
distribution of power-transfer flows.

The automatic toothed variable-speed gearbox comprises at least two stages of planetary gear trains, sun gears, planet gears which can be bilateral, and, optionally, one or more carrier gears.

Further, the automatic toothed variable-speed gearbox possesses not less than three degrees of freedom, thus allowing redistribution of the load, including situations when a driven gear or another gear is stopped; not less than two power-transfer flows; and provides the possibility of stopping one or more gears when other gears remain movable, wherein:
at least one sun gears can be made flexible;
any gear can be used for power input and power output;
one or more sun gears, can be used for internal gearing and/or external gearing;
a satellite gear of the first and/or second stage can be made bilateral (to split or join the power-transfer flows);
a carrier gear of the first stage can be integrated with the sun gear of the second stage or with a carrier gear of the second stage;
in particular operation modes, at least one control device can be coupled to any gear;
power can be transferred in forward or opposite direction;
the kinematic chains can be configured integrally in any order.

Advantageously, the automatic toothed variable-speed gearbox provides:
redistribution of the load and a smooth and discrete change of gear ratio, in relation to driving gears and driven gears, varying from maximum difference up to complete match thereof, wherein the gears are not disengaged, power flow is not disrupted, no control devices are used;
high efficiency factor almost close to one, when difference in rotations of the driving gears and driven gears is decreasing;
high motor capacity;
low material-, labor-, and power consumption during manufacture process;
high processability during manufacture process;
high operational characteristics;
optimum conditions for drive (motor) operation in different modes, thus reducing fuel consumption and exhaust emissions;
compact size and light weight;
simple construction;
low costs of production.

Unlimited examples of the kinematic chains in the toothed variable-speed gearbox can be seen in FIG. 1-40, wherein:
1—sun gear of the first stage;
2—first satellite gear of the first stage;
3—second satellite gear of the first stage, integrated with satellite gear 2 of the first stage;
4—carrier gear of the first stage;
5—external sun gear of the first stage;
6—internal sun gear of the first stage;
7—external sun gear of the second stage;
8—internal sun gear of the second stage;
9—carrier gear of the second stage;
10—first satellite gear of the second stage;

11—second satellite gear of the second stage;
12—sun gear of the second stage;
13—gear train of the first stage.

DETAILED DESCRIPTION OF THE INVENTION

Sun gear 1 of the first stage can function as a driving gear, while sun gear 12 of the second stage can function as a driven gear, or visa versa. By mating any suitable gears, the kinematic chains can be configured integral with further kinematic chains.

The automatic toothed variable-speed gearbox provides at least two power-transfer flows. As illustrated in FIG. 1, one power-transfer flow is external and flows from sun gear 1, through the first satellite gear 2 of the first stage, then through sun gear 5 of the first stage and sun gear 7 of the second stage, wherein sun gears 5 and 7 are integrated with each other, then the flow flows through satellite gear 10 of the second stage, and finally to sun gear 12 which is a driven gear; the other power-transfer flow is internal and flows from sun gear 1, through the first satellite gear 2 and through satellite gear 3 of the first stage, the gear 3 being integrated with gear 2, then the flow flows through the second sun gear 6 of the first stage, through carrier gear 9 of the second stage, through satellite gear 10 of the second stage, and finally to sun gear 12.

Principle of Operation

Stop of a gear in a stop position or adjacently to the stop position is achieved via balance of forces which are applied to the gear from different sides and which are originated from different power flows, wherein the forces are equal or similar in terms of magnitude and opposite in terms of orientation.

As illustrated in FIG. 1, forces originated from the external power-transfer flow and applied to sun gear 5 integrated with sun gear 7, are balanced by forces originated from the internal power-transfer flow and applied to gear 7; as according to the kinematic chains between the gears, the forces originated from these power flows are opposite in terms of orientation, thus allowing initial balance or stop of sun gears 5 and 7 integrated with each other in a position adjacent to the stop position thereof.

Further, such balance can be achieved for other gears, for example, for carrier gear 4 of the first stage and sun gear 7 of the second stage (see FIGS. 6, 8, 9) etc.

Magnitude of these balance forces are determined by appropriate geometrics of the gears and center-to-center distances therebetween, which are further determined by quantity of teeth thereof and gears engagement modules and by taking into account input power.

Automatic operation of the toothed variable-speed gearbox is based on initial correlation between forces as follows:

$$-F_7^1 = F_7^2 = F_9/2, \qquad (1)$$

where $F_7^1$—force applied to the sun gear of the first stage as originated from the external power-transfer flow;

$F_7^2$—force applied to the sun gear of the second stage as originated from the internal power-transfer flow, wherein this force is equal to half of force $F_9/2$ applied to the carrier gear of the same stage.

Thus, an opposite orientation of these forces, i.e. of force $-F_7^1$ as originated from the external power-transfer flow and of force $F_7^2$ as originated from the internal power-transfer flow, results in mutual balancing thereof and creating conditions to initially stop gear 7 in a stop position or adjacently to the stop position, thus practically resulting in stopping power transfer via the external power-transfer flow, wherein the power is operationally transferred via another power-transfer flow, e.g. via the internal power-transfer flow. Conditions as expressed by formula (1) can be created for other gears of the automatic toothed variable-speed gearbox.

Changing the load applied to the driving shaft and/or driven shaft results in changing the initial balance condition, thus resulting in re-distribution of power between the power-transfer flows, which in turn results in changing positions of the gears and, thereby, in changing gear ratio determined by difference and match of the gears' circular and relative velocities varying from intermediate values to full match and visa versa; herewith, the forces applied to the gears are not equal:

$$-F_7^1 \neq F_7^2 \neq F_9/2 \qquad (2)$$

Therefore, when the load is lowered, the forces applied to the gears tend to the balance position, and when the load is increased, the balance becomes disturbed, thus enabling automatic change of gear ratio without disengaging gears, wherein the change is assisted or not assisted by use of control devices.

BRIEF DESCRIPTION OF THE DRAWINGS

Exemplary embodiments of the kinematic chains in the toothed variable-speed gearbox can be seen in FIG. 1-40, wherein.

Figure 1:
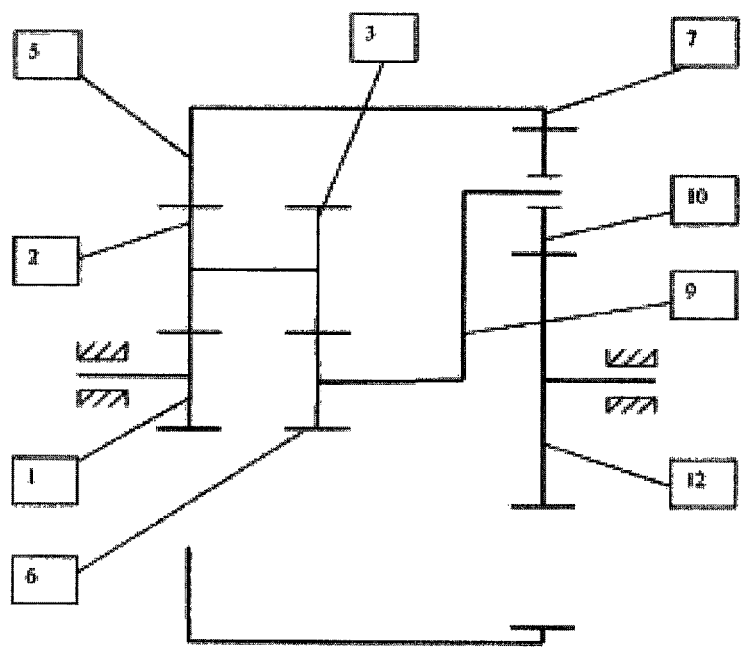
FIG. 1 is a view of an example of the automatic toothed variable-speed gearbox according to the claimed invention.
Figure 2:
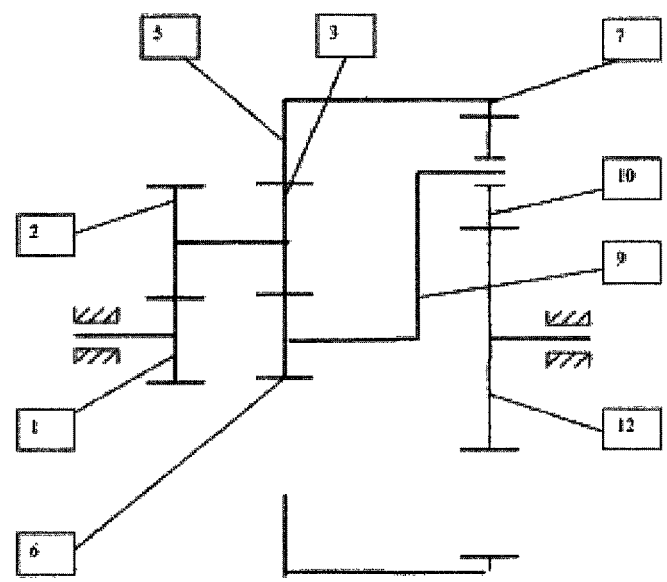
FIG. 2 is a view of an example of the automatic toothed variable-speed gearbox according to the claimed invention.
Figure 3:
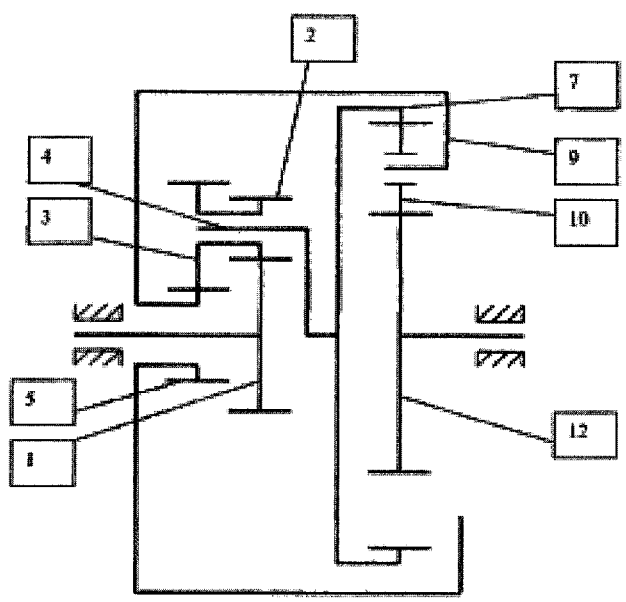
FIG. 3 is a view of an example of the automatic toothed variable-speed gearbox according to the claimed invention.
Figure 4:
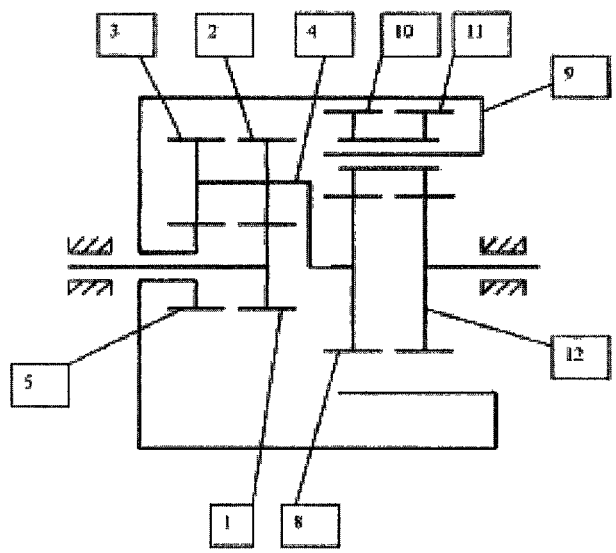
FIG. 4 is a view of an example of the automatic toothed variable-speed gearbox according to the claimed invention.
Figure 5:
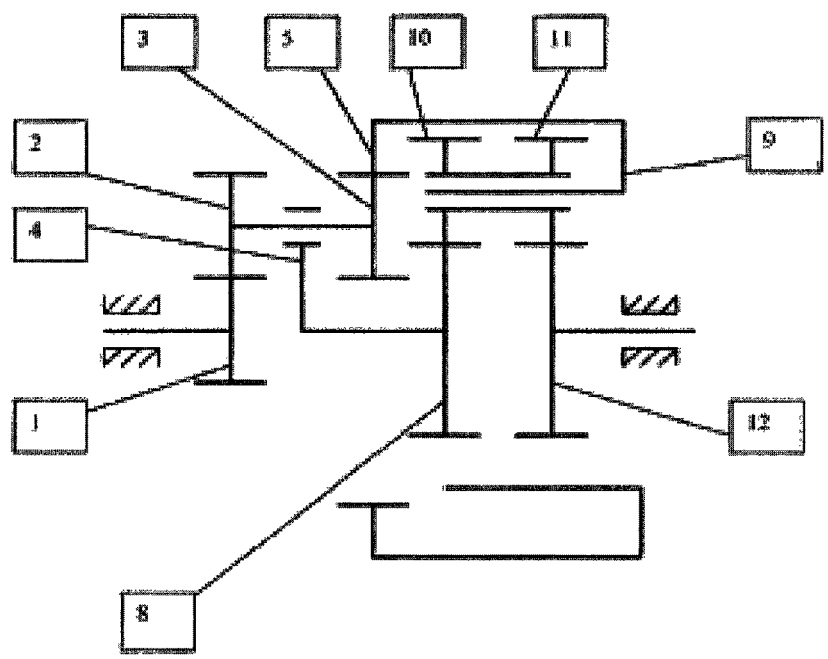
FIG. 5 is a view of an example of the automatic toothed variable-speed gearbox according to the claimed invention.
Figure 6:
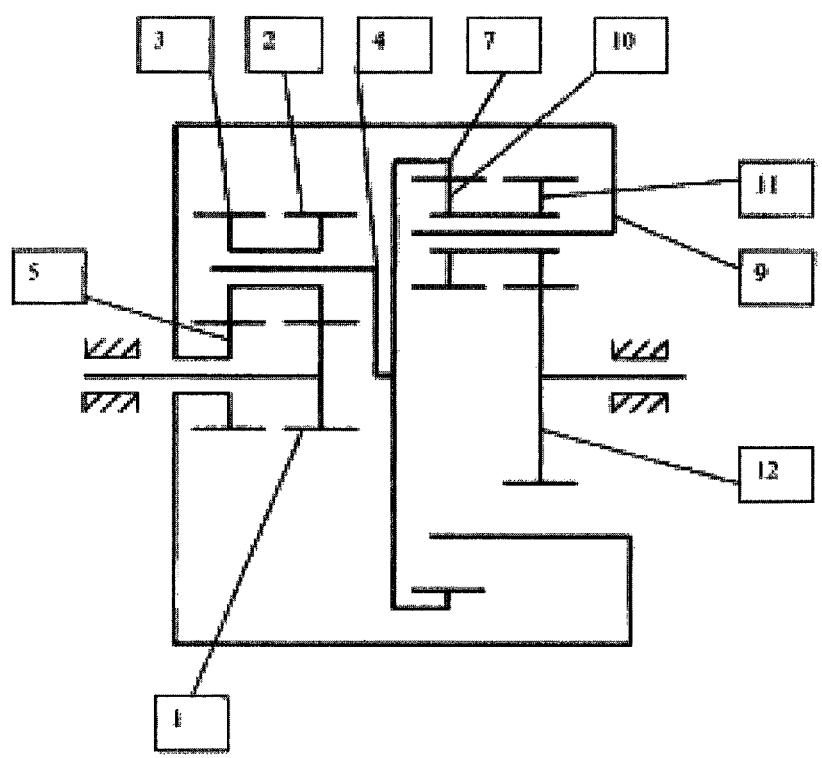
FIG. 6 is a view of an example of the automatic toothed variable-speed gearbox according to the claimed invention.
Figure 7:
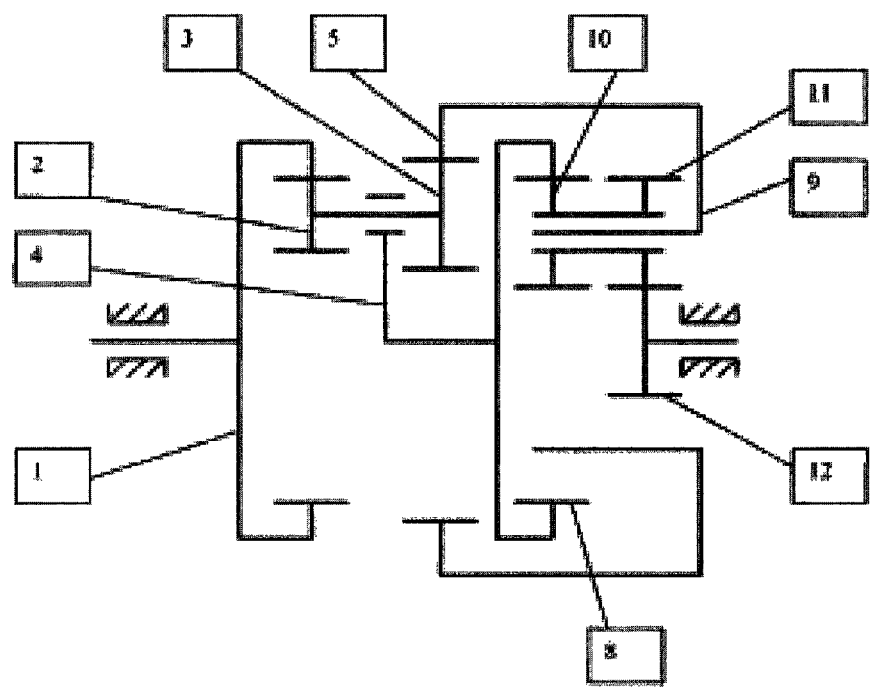
FIG. 7 is a view of an example of the automatic toothed variable-speed gearbox according to the claimed invention.
Figure 8:
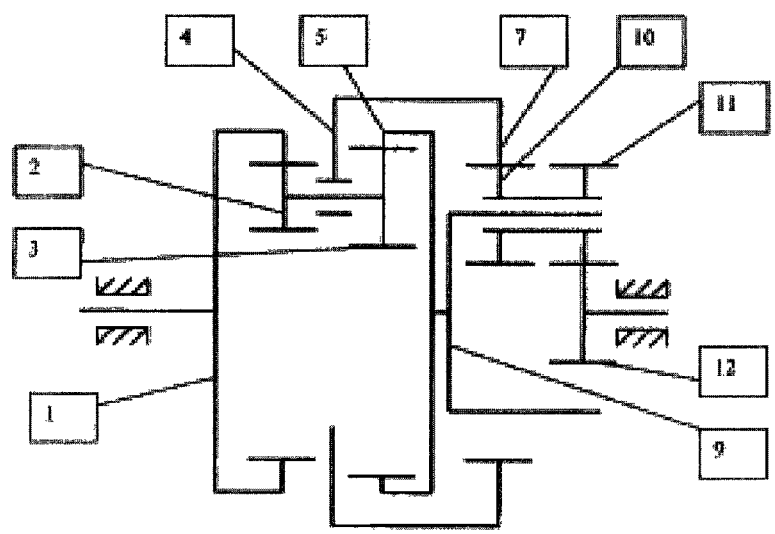
FIG. 8 is a view of an example of the automatic toothed variable-speed gearbox according to the claimed invention.
Figure 9:
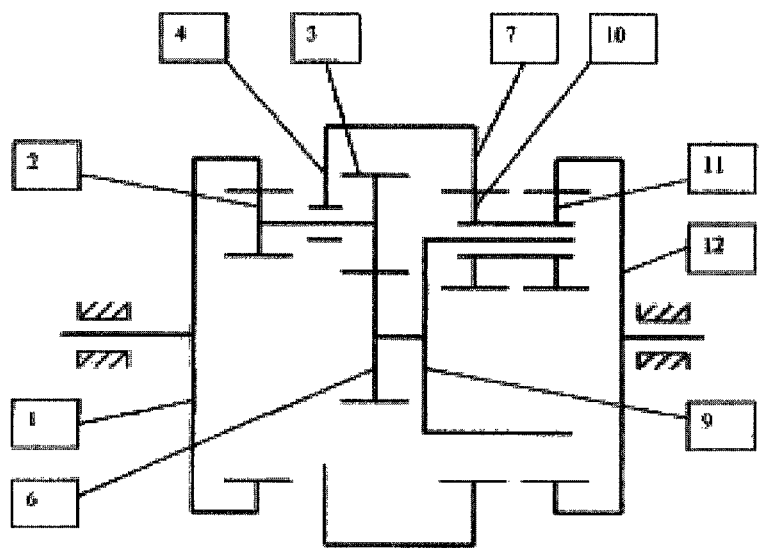
FIG. 9 is a view of an example of the automatic toothed variable-speed gearbox according to the claimed invention.
Figure 10:
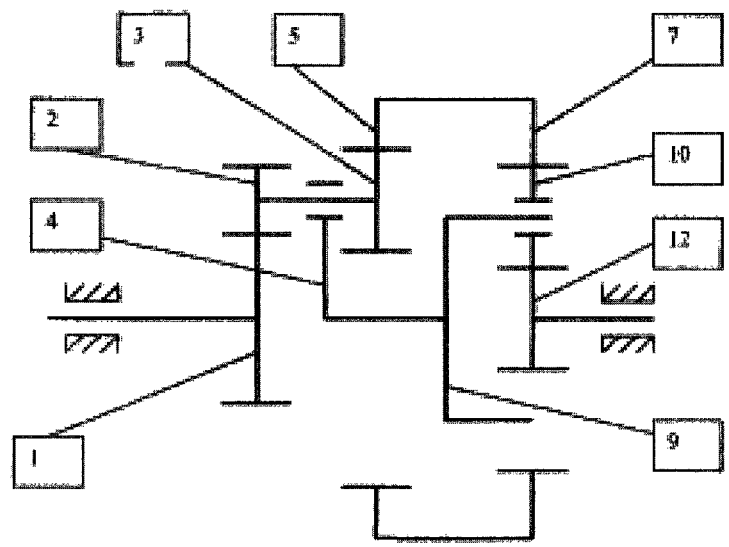
FIG. 10 is a view of an example of the automatic toothed variable-speed gearbox according to the claimed invention.
Figure 11:
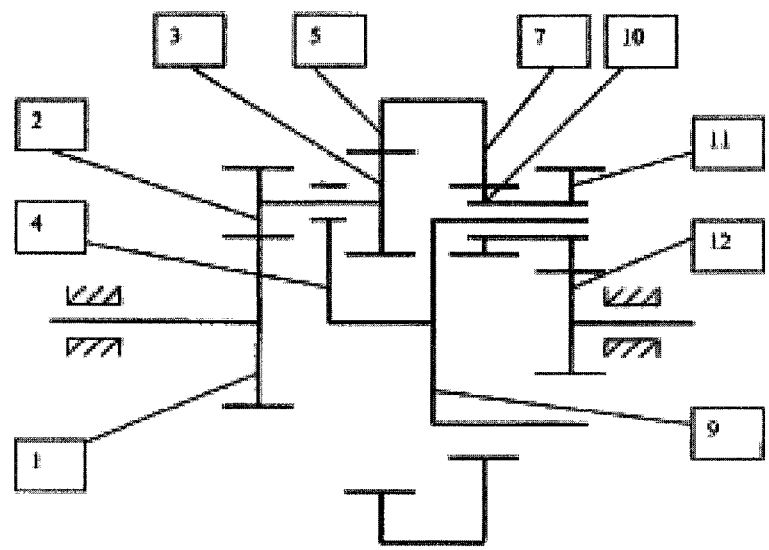
FIG. 11 is a view of an example of the automatic toothed variable-speed gearbox according to the claimed invention.
Figure 12:
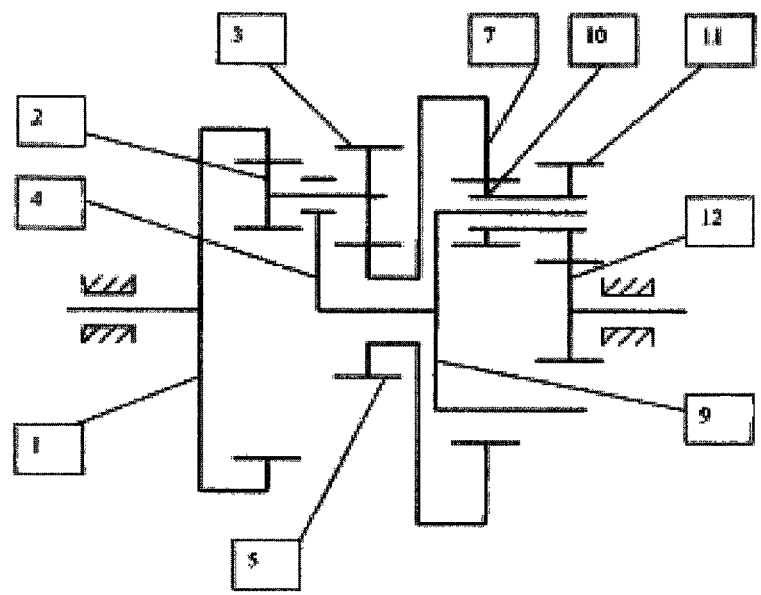
FIG. 12 is a view of an example of the automatic toothed variable-speed gearbox according to the claimed invention.
Figure 13:
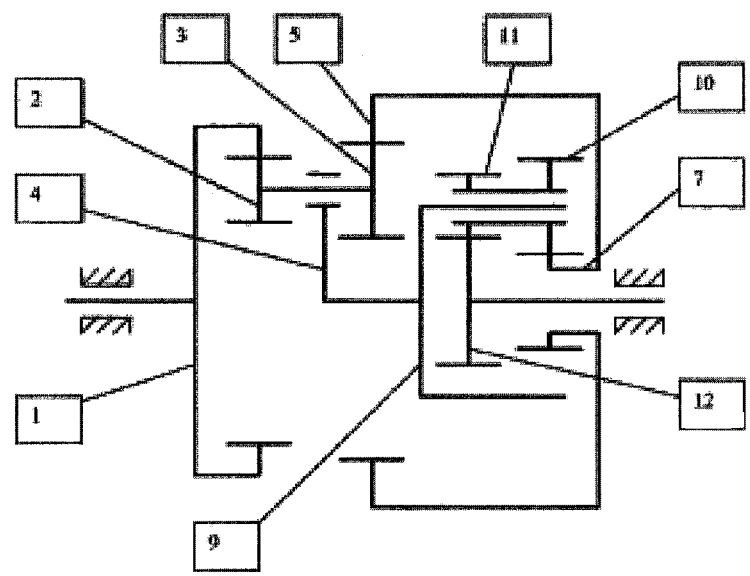
FIG. 13 is a view of an example of the automatic toothed variable-speed gearbox according to the claimed invention.
Figure 14:
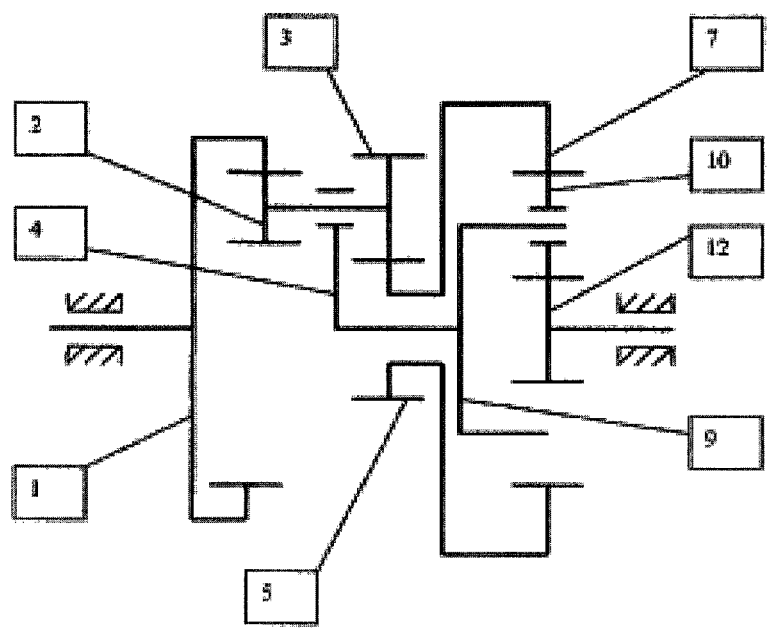
FIG. 14 is a view of an example of the automatic toothed variable-speed gearbox according to the claimed invention.
Figure 15:
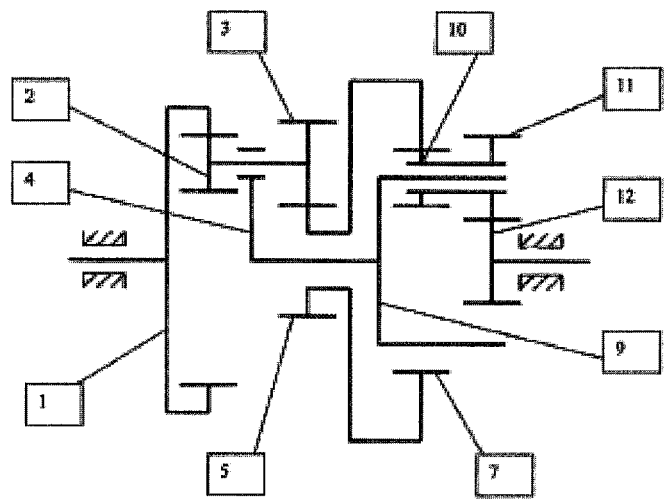
FIG. 15 is a view of an example of the automatic toothed variable-speed gearbox according to the claimed invention.
Figure 16:
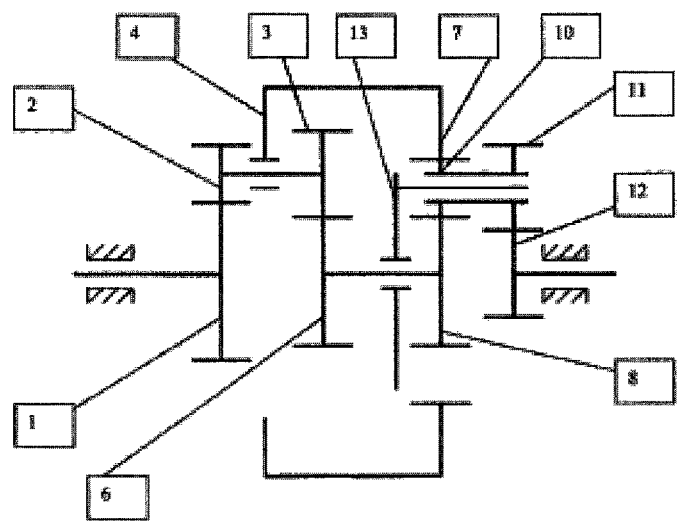
FIG. 16 is a view of an example of the automatic toothed variable-speed gearbox according to the claimed invention.
Figure 17:
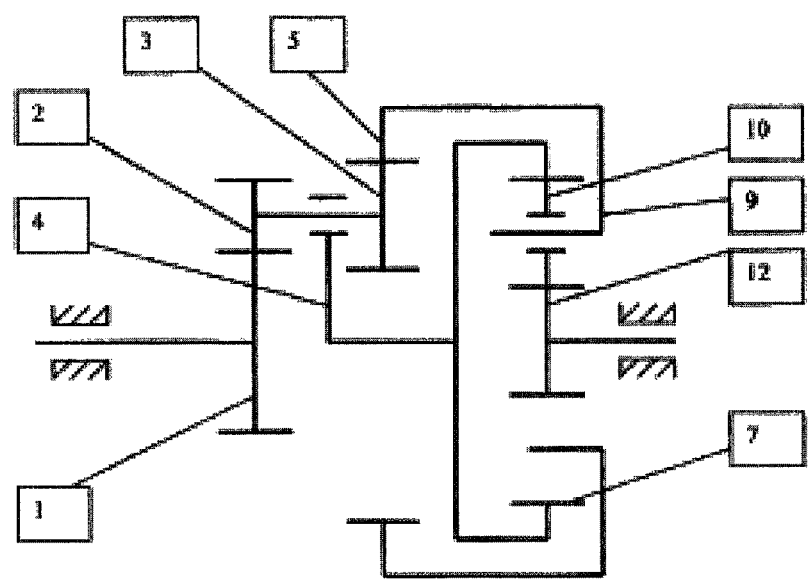
FIG. 17 is a view of an example of the automatic toothed variable-speed gearbox according to the claimed invention.
Figure 18:
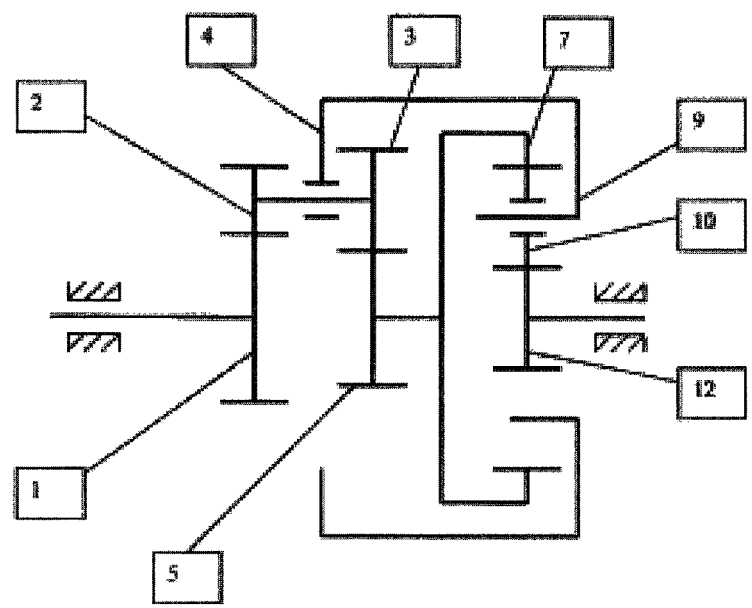
FIG. 18 is a view of an example of the automatic toothed variable-speed gearbox according to the claimed invention.
Figure 19:
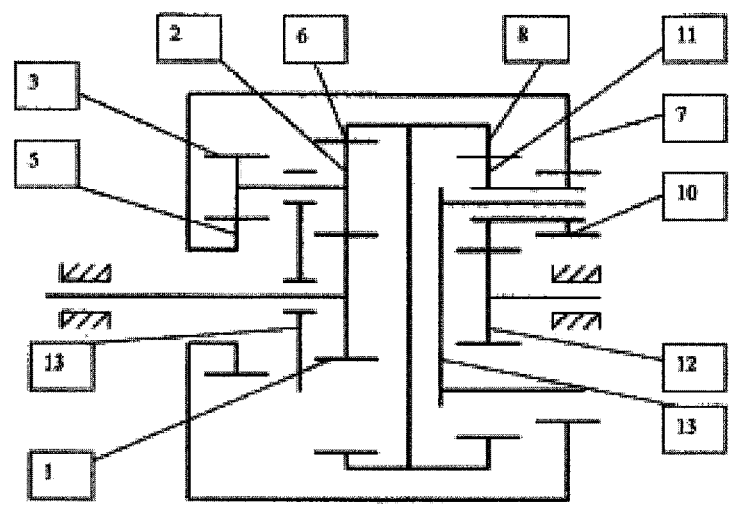
FIG. 19 is a view of an example of the automatic toothed variable-speed gearbox according to the claimed invention.
Figure 20:
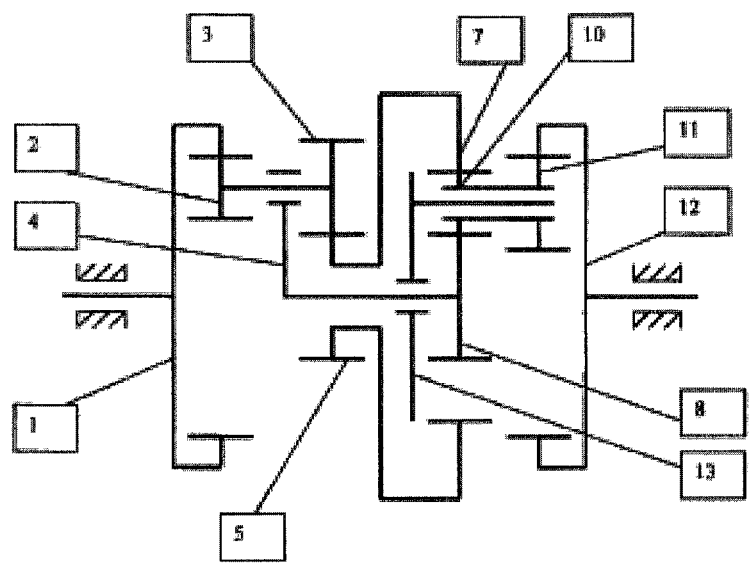
FIG. 20 is a view of an example of the automatic toothed variable-speed gearbox according to the claimed invention.
Figure 21:
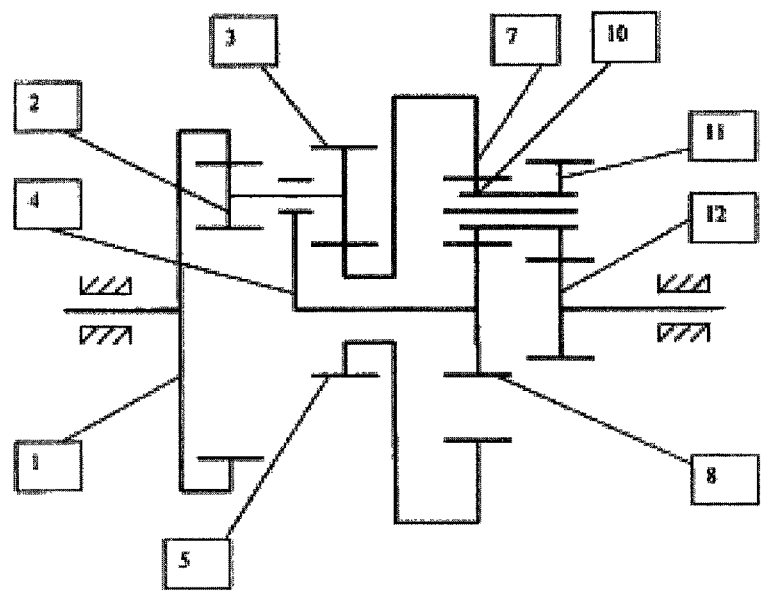
FIG. 21 is a view of an example of the automatic toothed variable-speed gearbox according to the claimed invention.
Figure 22:
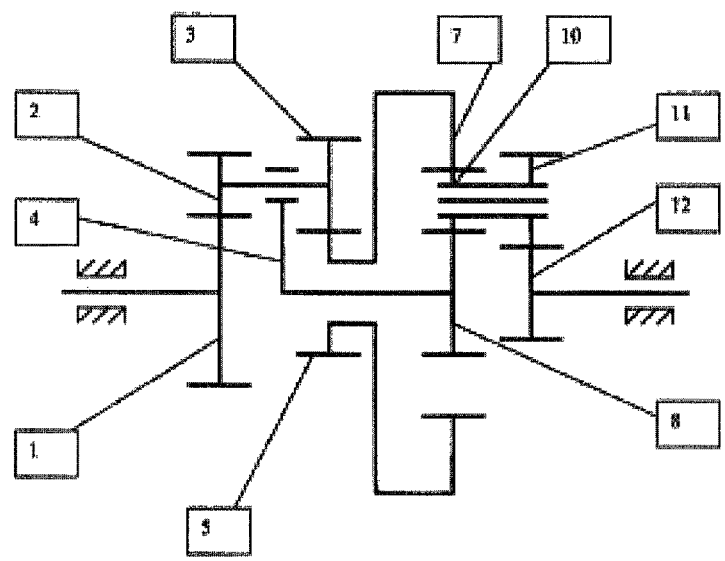
FIG. 22 is a view of an example of the automatic toothed variable-speed gearbox according to the claimed invention.
Figure 23:
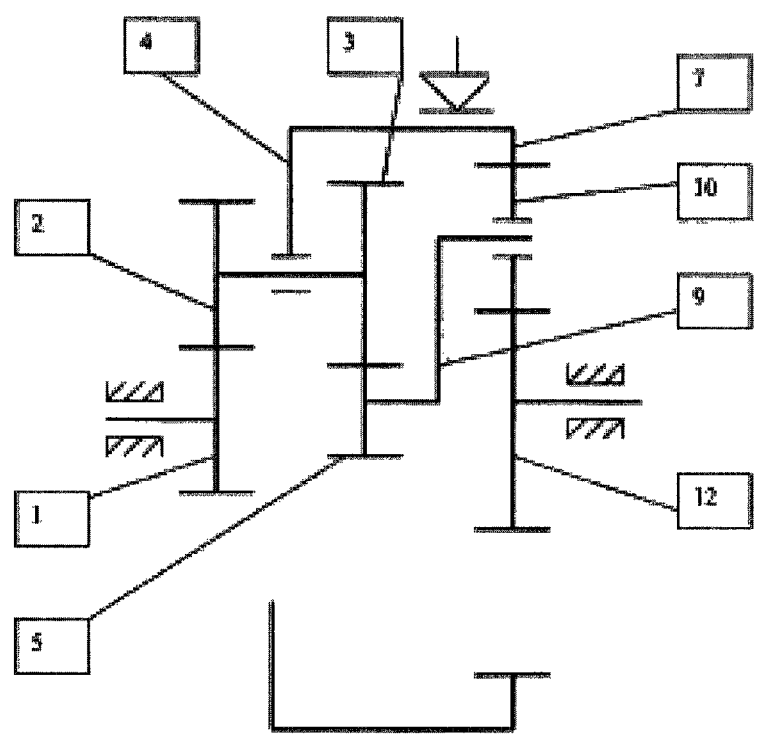
FIG. 23 is a view of an example of the automatic toothed variable-speed gearbox according to the claimed invention.
Figure 24:
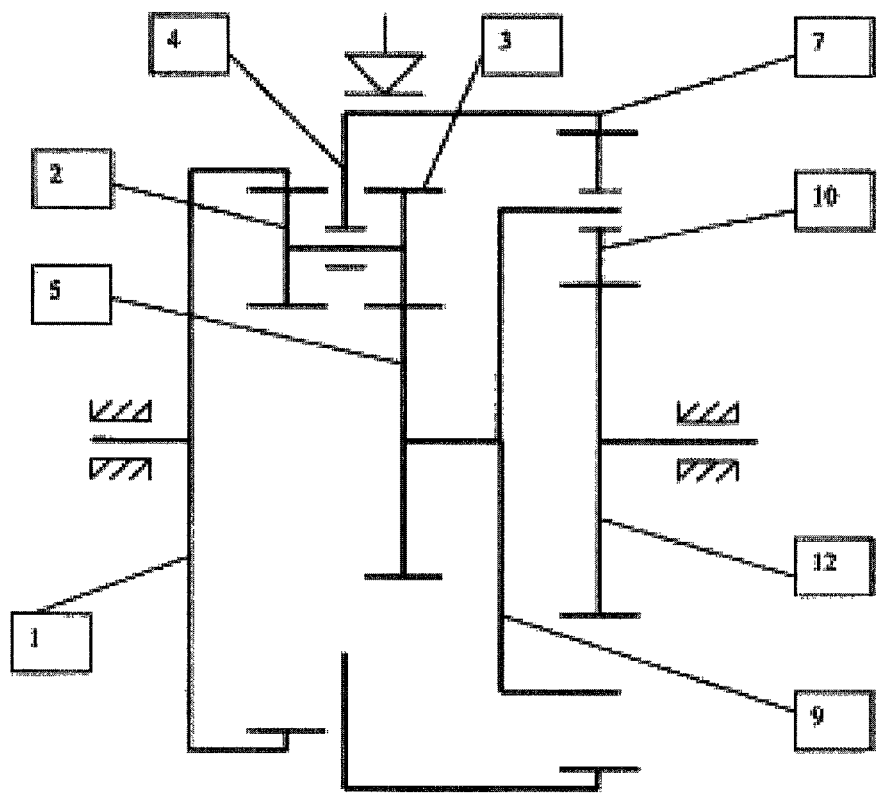
FIG. 24 is a view of an example of the automatic toothed variable-speed gearbox according to the claimed invention.
Figure 25:
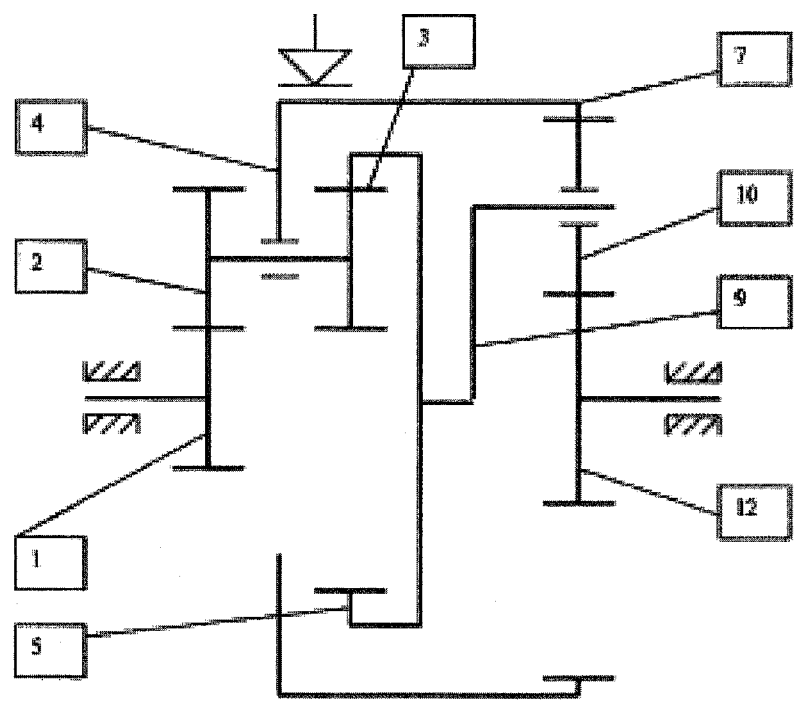
FIG. 25 is a view of an example of the automatic toothed variable-speed gearbox according to the claimed invention.
Figure 26:
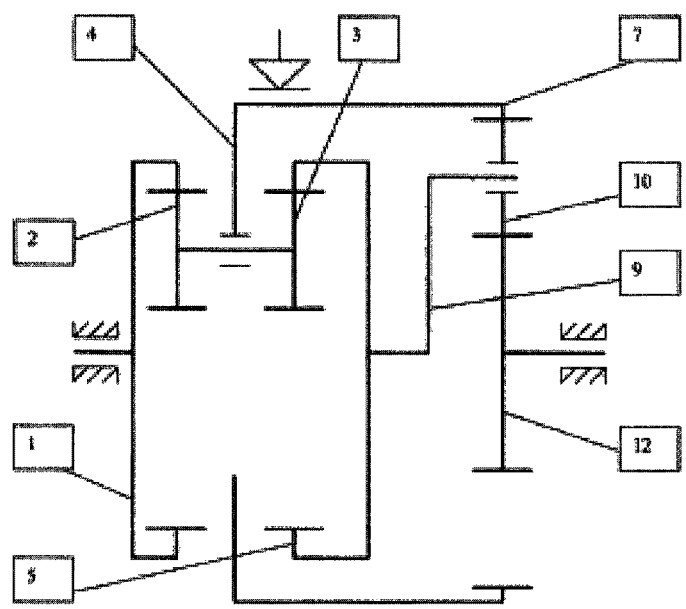
FIG. 26 is a view of an example of the automatic toothed variable-speed gearbox according to the claimed invention.
Figure 27:
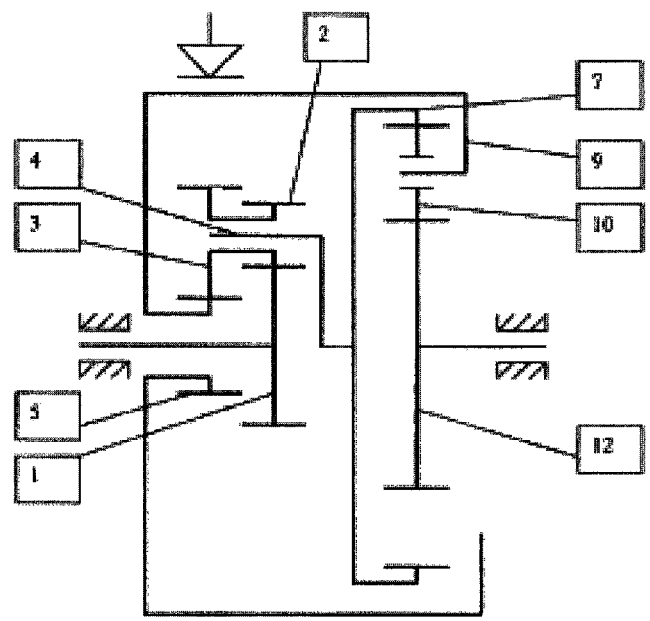
FIG. 27 is a view of an example of the automatic toothed variable-speed gearbox according to the claimed invention.
Figure 28:
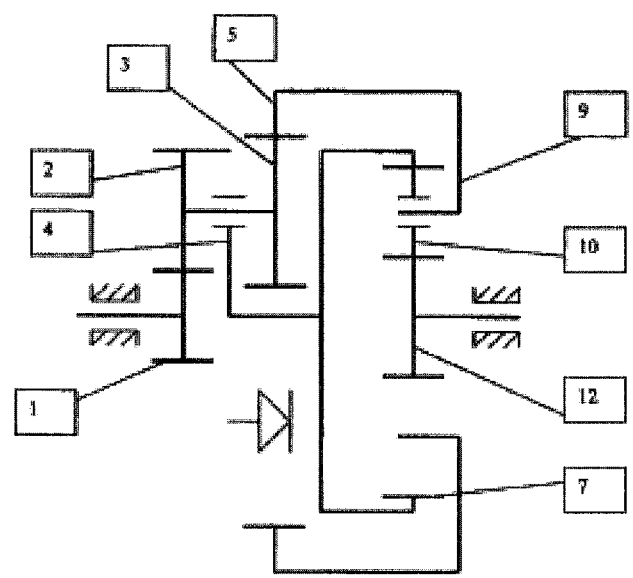
FIG. 28 is a view of an example of the automatic toothed variable-speed gearbox according to the claimed invention.
Figure 29:
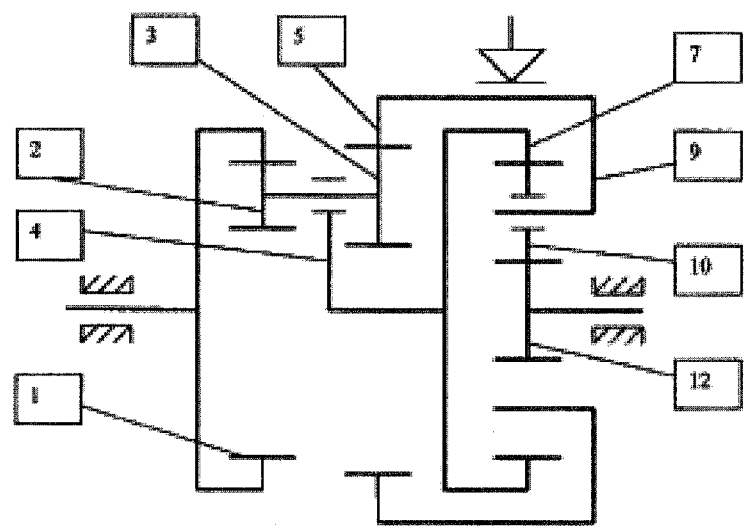
FIG. 29 is a view of an example of the automatic toothed variable-speed gearbox according to the claimed invention.
Figure 30:
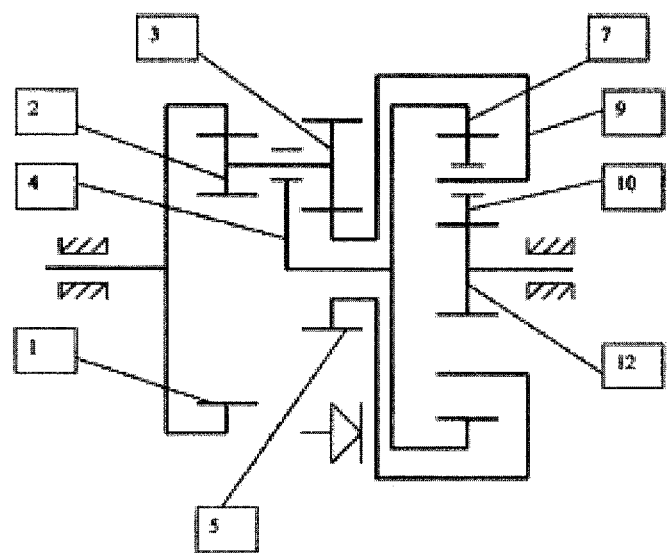
FIG. 30 is a view of an example of the automatic toothed variable-speed gearbox according to the claimed invention.
Figure 31:
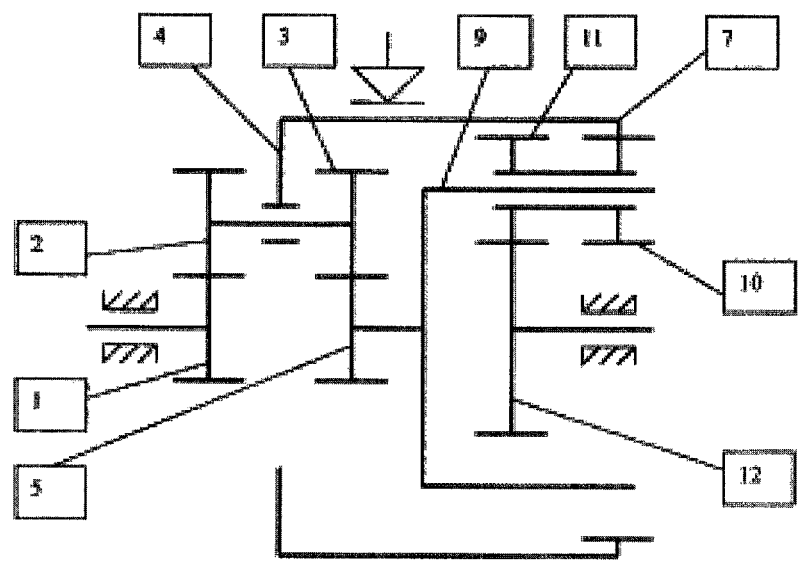
FIG. 31 is a view of an example of the automatic toothed variable-speed gearbox according to the claimed invention.
Figure 32:
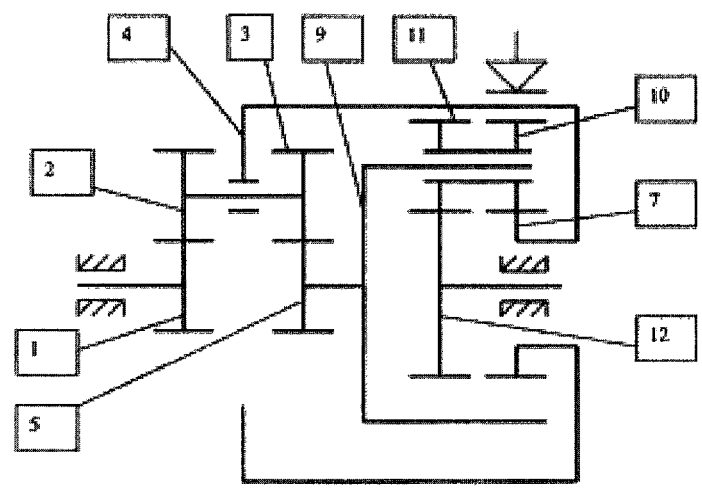
FIG. 32 is a view of an example of the automatic toothed variable-speed gearbox according to the claimed invention.
Figure 33:
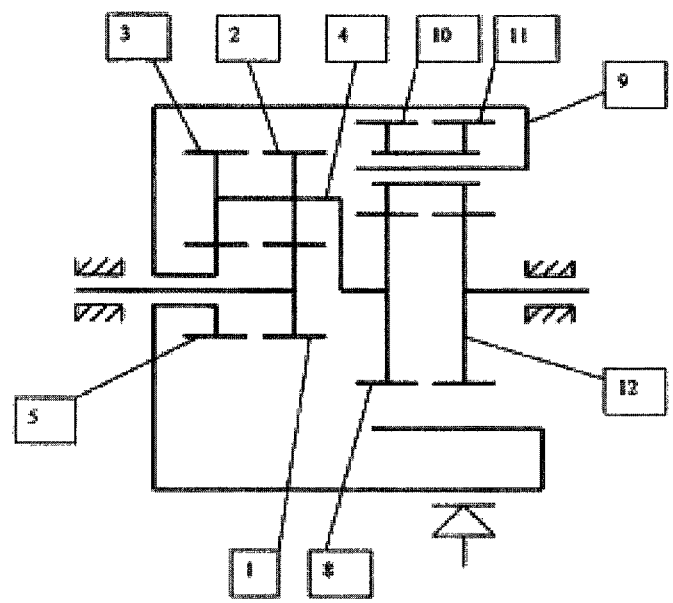
FIG. 33 is a view of an example of the automatic toothed variable-speed gearbox according to the claimed invention.
Figure 34:
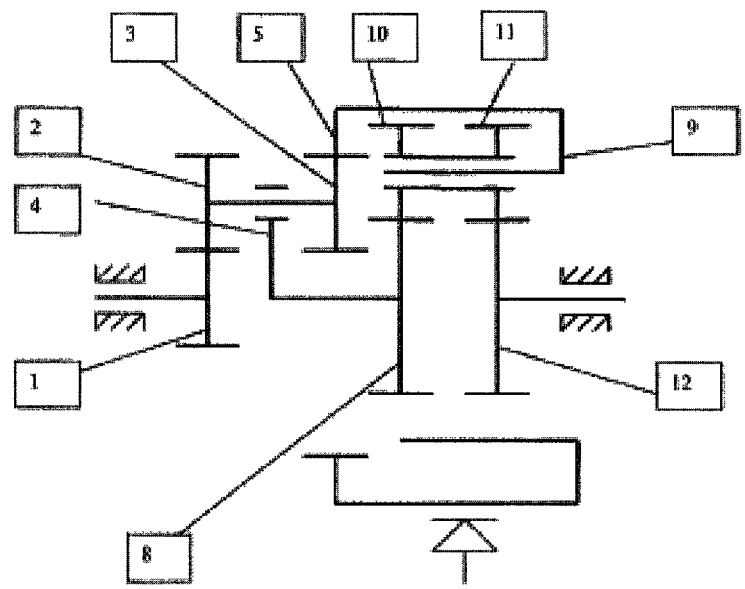
FIG. 34 is a view of an example of the automatic toothed variable-speed gearbox according to the claimed invention.
Figure 35:
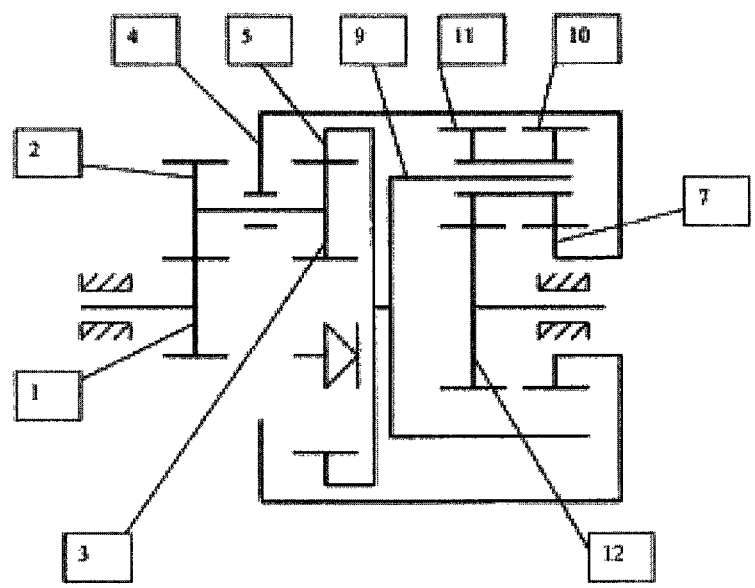
FIG. 35 is a view of an example of the automatic toothed variable-speed gearbox according to the claimed invention.
Figure 36:
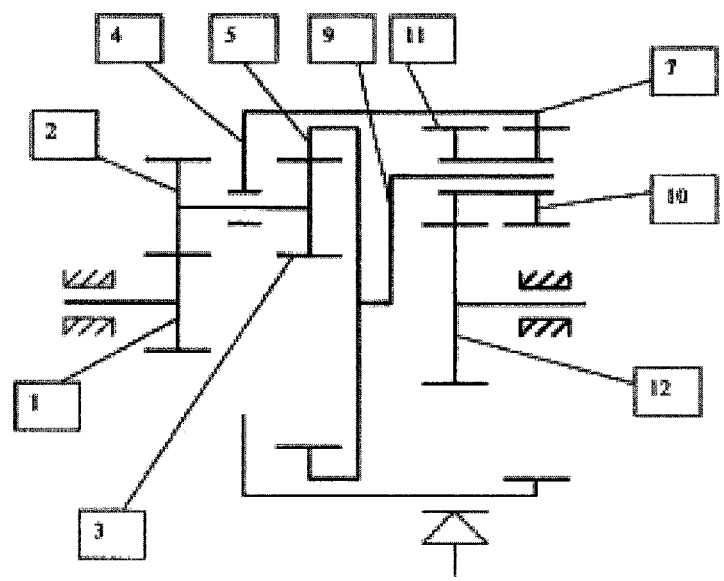
FIG. 36 is a view of an example of the automatic toothed variable-speed gearbox according to the claimed invention.
Figure 37:
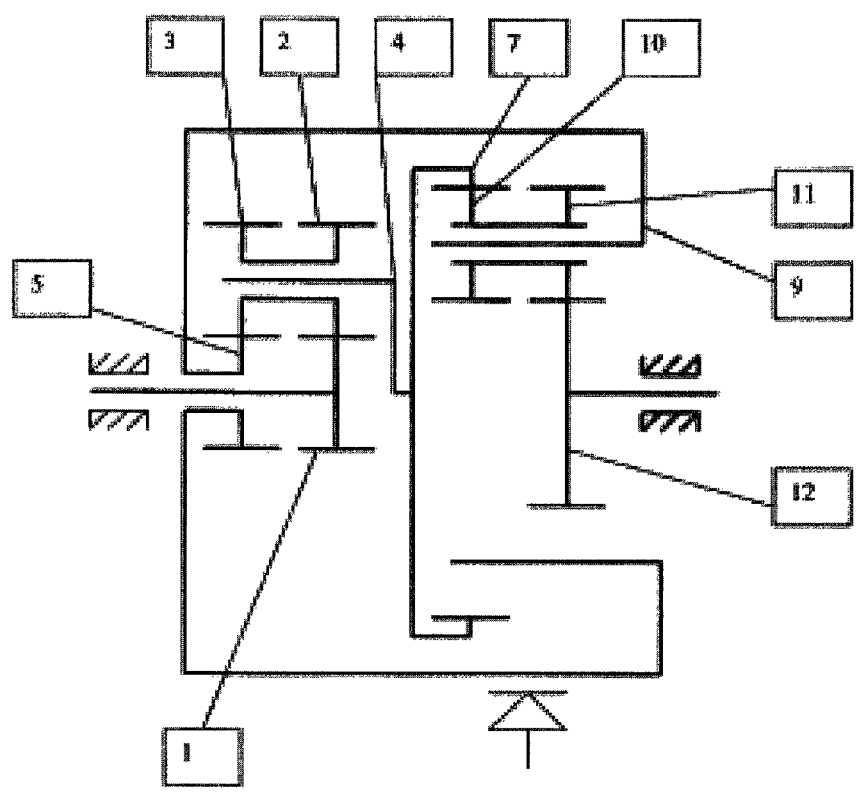
FIG. 37 is a view of an example of the automatic toothed variable-speed gearbox according to the claimed invention.
Figure 38:
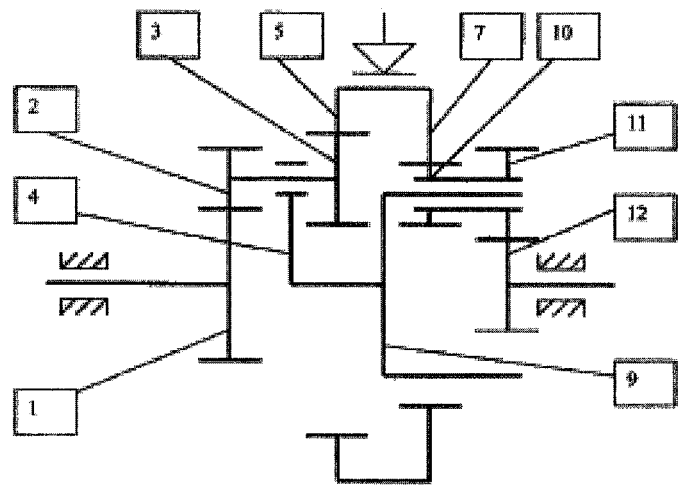
FIG. 38 is a view of an example of the automatic toothed variable-speed gearbox according to the claimed invention.
Figure 39:
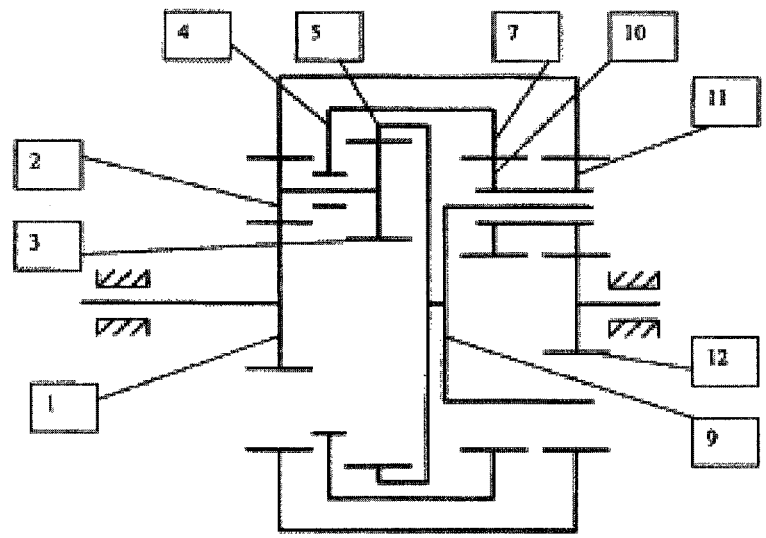
FIG. 39 is a view of an example of the automatic toothed variable-speed gearbox according to the claimed invention.
Figure 40:
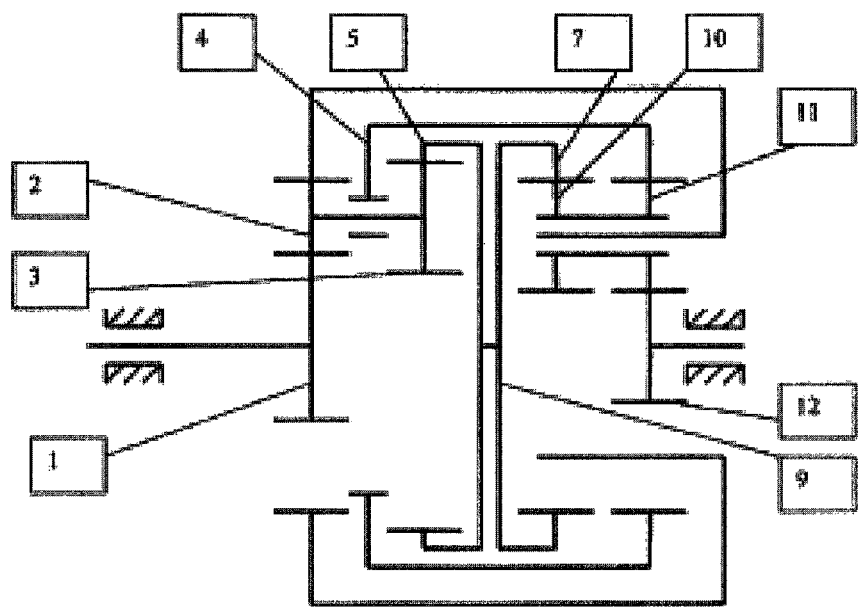
FIG. 40 is a view of an example of the automatic toothed variable-speed gearbox according to the claimed invention.

The invention claimed is:

1. Automatic toothed variable-speed gearbox, comprising:
   a driving gear,
   a driven gear,
   gears of a planetary mechanism configured to transfer power from the driving gear to the driven gear through at least a first power-transfer flow and a second power-transfer flow flowing from the driving gear to the driven gear,
   characterized in that the first power-transfer flow comprises at least one gear of a planetary mechanism, the second power-transfer flow engages with said at least one gear, the first power-transfer flow and the second power-transfer flow are configured to apply forces equal in terms of magnitude and opposite in terms of orientation to said at least one gear, to stop said at least one gear, thus stopping power transfer via the first power-transfer flow and re-distributing power transfer to the second power-transfer flow, and
   wherein a carrier gear of a first stage is integrated with an internal sun gear of a second stage, and an external sun gear of a first stage is integrated with a carrier gear of a second stage.

2. Automatic toothed variable-speed gearbox according to claim 1, wherein the gears of a planetary mechanism are selected from the group including sun gears, planetary gears or a gear train and carrier gears.

3. Automatic toothed variable-speed gearbox as claimed in claim 2 characterized in that at least one of the sun gears is made flexible.

4. Automatic toothed variable-speed gearbox as claimed in claim 3, characterized in that any gear thereof is used for power input and/or power output.

5. Automatic toothed variable-speed gearbox as claimed in claim 4, characterized in that at least one control device is used.

6. Automatic toothed variable-speed gearbox as claimed in claim 5, characterized in that kinematic chains are integrally configured in any order.

7. Automatic toothed variable-speed gearbox according to claim 1, comprising at least two stages of planetary mechanisms.

8. Automatic toothed variable-speed gearbox according to claim 1, wherein the driving gear is a sun gear of a first stage of planetary mechanisms and the driven gear is a sun gear of a second stage of planetary mechanisms or the driving gear is a sun gear of a second stage of planetary mechanisms and the driven gear is a sun gear of a first stage of planetary mechanisms.

9. Automatic toothed variable-speed gearbox, comprising:
   a driving gear,
   a driven gear,
   gears of a planetary mechanism configured to transfer power from the driving gear to the driven gear through at least a first power-transfer flow and a second power-transfer flow flowing from the driving gear to the driven gear,
   characterized in that the first power-transfer flow comprises at least one gear of a planetary mechanism, the second power-transfer flow engages with said at least one gear, the first power-transfer flow and the second power-transfer flow are configured to apply forces equal in terms of magnitude and opposite in terms of orientation to said at least one gear, to stop said at least one gear, thus stopping power transfer via the first power-transfer flow and re-distributing power transfer to the second power-transfer flow,
   wherein the carrier gear of a first stage is integrated with an internal sun gear of a second stage, and an external sun gear of a first stage is integrated with a carrier gear of a second stage, and
   characterized in that kinematic chains are integrally configured in any order.

10. Automatic toothed variable-speed gearbox as claimed in claim 9, characterized in that any gear thereof is used for power input and/or power output.

11. Automatic toothed variable-speed gearbox as claimed in claim 10, characterized in that at least one control device is used.

12. Automatic toothed variable-speed gearbox as claimed in claim 11, characterized in that kinematic chains are integrally configured in any order.

13. Automatic toothed variable-speed gearbox according to claim 9, comprising at least two stages of planetary mechanisms.

14. Automatic toothed variable-speed gearbox according to claim 13, wherein a carrier gear of a first stage is integrated with an internal sun gear of a second stage, and an external sun gear of a first stage is integrated with a carrier gear of a second stage.

15. Automatic toothed variable-speed gearbox according to claim 13, wherein the driving gear is a sun gear of a first stage of planetary mechanisms and the driven gear is a sun gear of a second stage of planetary mechanisms or the driving gear is a sun gear of a second stage of planetary mechanisms and the driven gear is a sun gear of a first stage of planetary mechanisms.

16. Automatic toothed variable speed gearbox as claimed in claim 9, wherein the gears of a planetary mechanism are selected from the group including sun gears, planetary gears or a gear train and carrier gears.

17. Automatic toothed variable speed gearbox as claimed in claim 16, characterized in that at least one of the sun gears is made flexible.

* * * * *